US011874690B2

(12) United States Patent
Guzik et al.

(10) Patent No.: US 11,874,690 B2
(45) Date of Patent: *Jan. 16, 2024

(54) HIERARCHICAL DATA INGESTION IN A UNIVERSAL SCHEMA

(71) Applicants: Getac Technology Corporation, New Taipei (TW); WHP Workflow Solutions, Inc., North Charleston, SC (US)

(72) Inventors: Thomas Guzik, Edina, MN (US); Muhammad Adeel, Edina, MN (US); Ryan Kucera, Columbia Heights, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,936

(22) Filed: Mar. 6, 2023

(65) Prior Publication Data
US 2023/0205739 A1    Jun. 29, 2023

Related U.S. Application Data

(63) Continuation of application No. 17/107,830, filed on Nov. 30, 2020, now Pat. No. 11,604,773.

(51) Int. Cl.
*G06F 16/00* (2019.01)
*G06F 16/21* (2019.01)
(Continued)

(52) U.S. Cl.
CPC .......... *G06F 16/211* (2019.01); *G06F 9/4411* (2013.01); *G06F 16/2457* (2019.01); *G06F 16/252* (2019.01)

(58) Field of Classification Search
CPC .. G06F 16/211; G06F 9/4411; G06F 16/2457; G06F 16/252
See application file for complete search history.

(56) References Cited

U.S. PATENT DOCUMENTS 6,760,744 B1   7/2004   Halaas et al.
7,917,888 B2   3/2011   Chong et al.
(Continued)

FOREIGN PATENT DOCUMENTS

CN   109671266 B   11/2020
JP   2008204219 A   9/2008
(Continued)

OTHER PUBLICATIONS

International Patent Application No. PCT/US2021/060890, International Search Report and Written Opinion dated Mar. 21, 2022, 11 pages.
(Continued)

*Primary Examiner* — Tyler J Torgrimson

(57) ABSTRACT

This disclosure describes techniques for creating a universal schema with default fields that support sensor formats of different devices. In one example, the universal schema supports substantial equivalents between data fields in different sensor formats. Further, a sensor format may be configured to support inheritance and aggregation of sensor formats in prior devices. Accordingly, the mapping of sensor formats that supports inheritance and aggregation in the universal schema may provide several advantages such as capturing a mapping of substantive equivalents between the fields in different sensor formats.

20 Claims, 8 Drawing Sheets

(51) Int. Cl.
  *G06F 9/4401* (2018.01)
  *G06F 16/2457* (2019.01)
  *G06F 16/25* (2019.01)

(56) References Cited

U.S. PATENT DOCUMENTS

| | | | |
|---|---|---|---|
| 8,452,722 | B2 | 5/2013 | Naeve et al. |
| 8,606,844 | B2 | 12/2013 | Kaufman et al. |
| 8,688,320 | B2 | 4/2014 | Faenger |
| 9,110,774 | B1 | 8/2015 | Bonn et al. |
| 9,264,678 | B2 | 2/2016 | Nuyttens et al. |
| 9,449,229 | B1 | 9/2016 | Laska et al. |
| 9,483,732 | B1 | 11/2016 | Milakovich |
| 9,485,474 | B2 | 11/2016 | Kim et al. |
| 9,681,104 | B2 | 6/2017 | Billau et al. |
| 9,723,251 | B2 | 8/2017 | Slotky |
| 9,738,125 | B1 | 8/2017 | Brickley et al. |
| 9,755,890 | B2 | 9/2017 | Robertson et al. |
| 9,832,205 | B2 | 11/2017 | Santhi et al. |
| 9,848,312 | B2 | 12/2017 | Sundel et al. |
| 9,852,132 | B2 | 12/2017 | Chhichhia et al. |
| 9,886,261 | B1 | 2/2018 | Hotchkies |
| 10,324,773 | B2 | 6/2019 | Wing et al. |
| 10,460,014 | B2 | 10/2019 | Lloyd et al. |
| 10,540,883 | B1 | 1/2020 | Keil et al. |
| 10,902,955 | B1 | 1/2021 | Federoff et al. |
| 11,238,290 | B2 | 2/2022 | Burns et al. |
| 2003/0081127 | A1 | 5/2003 | Kirmuss |
| 2003/0095688 | A1 | 5/2003 | Kirmuss |
| 2003/0163512 | A1 | 8/2003 | Mikamo |
| 2003/0208679 | A1 | 11/2003 | Vazquez |
| 2006/0257001 | A1 | 11/2006 | Veen et al. |
| 2008/0147267 | A1 | 6/2008 | Plante et al. |
| 2008/0303903 | A1 | 12/2008 | Bentley et al. |
| 2009/0150017 | A1 | 6/2009 | Caminiti et al. |
| 2009/0210455 | A1 | 8/2009 | Sarkar et al. |
| 2009/0248711 | A1 | 10/2009 | Martinez et al. |
| 2009/0284359 | A1 | 11/2009 | Huang et al. |
| 2010/0036560 | A1 | 2/2010 | Wright et al. |
| 2010/0144318 | A1 | 6/2010 | Cable |
| 2011/0205068 | A1 | 8/2011 | Huynh et al. |
| 2011/0302151 | A1 | 12/2011 | Abadi et al. |
| 2012/0084747 | A1 | 4/2012 | Chakradhar et al. |
| 2013/0039542 | A1 | 2/2013 | Guzik |
| 2013/0344856 | A1 | 12/2013 | Silver et al. |
| 2013/0347005 | A1 | 12/2013 | Lam et al. |
| 2014/0343796 | A1 | 11/2014 | Abuelsaad et al. |
| 2015/0089019 | A1 | 3/2015 | Chou |
| 2015/0341370 | A1 | 11/2015 | Khan |
| 2016/0042767 | A1 | 2/2016 | Araya et al. |
| 2016/0086397 | A1 | 3/2016 | Phillips |
| 2016/0153801 | A1 | 6/2016 | Cho et al. |
| 2016/0190859 | A1 | 6/2016 | Blum et al. |
| 2016/0248856 | A1* | 8/2016 | Kao ............... H04L 67/12 |
| 2016/0371553 | A1 | 12/2016 | Farnham, IV et al. |
| 2016/0378607 | A1 | 12/2016 | Kumar et al. |
| 2017/0011324 | A1 | 1/2017 | Truong et al. |
| 2017/0048482 | A1 | 2/2017 | Drako et al. |
| 2017/0148027 | A1 | 5/2017 | Yu et al. |
| 2017/0161323 | A1 | 6/2017 | Simitsis et al. |
| 2017/0161409 | A1 | 6/2017 | Martin |
| 2017/0164062 | A1 | 6/2017 | Abramov et al. |
| 2018/0079413 | A1 | 3/2018 | Herrero et al. |
| 2018/0145923 | A1 | 5/2018 | Chen et al. |
| 2018/0285759 | A1 | 10/2018 | Wood et al. |
| 2018/0365909 | A1 | 12/2018 | Cheng et al. |
| 2019/0019122 | A1 | 1/2019 | Allen |
| 2019/0026665 | A1 | 1/2019 | Caskey et al. |
| 2019/0043351 | A1 | 2/2019 | Yang et al. |
| 2019/0054925 | A1 | 2/2019 | Froeschl et al. |
| 2019/0095805 | A1 | 3/2019 | Tristan et al. |
| 2019/0140886 | A1 | 5/2019 | Zywicki et al. |
| 2019/0325354 | A1 | 10/2019 | Rajnayak et al. |
| 2020/0007827 | A1 | 1/2020 | Saad et al. |
| 2020/0072637 | A1 | 3/2020 | Guidotti et al. |
| 2020/0074156 | A1 | 3/2020 | Janumpally et al. |
| 2020/0081899 | A1* | 3/2020 | Shapur ............... G06F 16/211 |
| 2020/0145620 | A1 | 5/2020 | Alcantara et al. |
| 2020/0151360 | A1 | 5/2020 | Zavesky et al. |
| 2020/0172112 | A1 | 6/2020 | Kawashima |
| 2020/0211216 | A1 | 7/2020 | Hagio et al. |
| 2020/0304854 | A1 | 9/2020 | Baumgartner et al. |
| 2020/0312046 | A1 | 10/2020 | Righi et al. |
| 2020/0351381 | A1 | 11/2020 | Lacey et al. |
| 2020/0387833 | A1 | 12/2020 | Kursun |
| 2021/0076002 | A1 | 3/2021 | Peters et al. |
| 2021/0089374 | A1 | 3/2021 | Watson et al. |
| 2021/0133808 | A1 | 5/2021 | Chan et al. |
| 2021/0136277 | A1 | 5/2021 | McFarlane |
| 2021/0272702 | A1 | 9/2021 | Hakami |
| 2021/0297929 | A1 | 9/2021 | Frusina et al. |
| 2021/0377205 | A1 | 12/2021 | Brown et al. |
| 2022/0014907 | A1 | 1/2022 | Boyd et al. |
| 2022/0169258 | A1 | 6/2022 | Samarthyam et al. |

FOREIGN PATENT DOCUMENTS

| | | |
|---|---|---|
| KR | 20130010400 A | 1/2013 |
| KR | 20190086134 A | 7/2019 |
| WO | 2010056891 A1 | 5/2010 |

OTHER PUBLICATIONS

International Patent Application No. PCT/US2021/060892, International Search Report and Written Opinion dated Mar. 21, 2022, 10 pages.
International Patent Application No. PCT/US2021/060893, International Search Report and Written Opinion dated Mar. 21, 2022, 9 pages.
International Patent Application No. PCT/US2021/060894, International Search Report and Written Opinion dated Mar. 21, 2022, 9 pages.
International Patent Application No. PCT/US2021/060895, International Search Report and Written Opinion dated Mar. 21, 9 pages.
International Patent Application No. PCT/US2021/060896, International Search Report and Written Opinion dated Mar. 14, 2022, 11 pages.
Juan Rendon et al. Structural combination of neural network models. 2016 IEEE 16th International Conference on Data Mining Workshops (ICDMW). IEEE. Dec. 12, 2016, pp. 406-413. Section II; and figure 2.
Massimo Bonavita et al. Machine Learning for Model Error Inference and Correction. Journal of Advances in Modeling Earth Systems. Nov. 13, 2020, pp. 1-22. Section 2.1; and figure 1.
Md Manjurul Ahsan et al. Deep MLP-CNN Model Using Mixed-Data to Distinguish between COVID-19 and Non-COVID-19 Patients. Symmetry 2020. Sep. 16, 2020, pp. 1-14. Section 2; and figure 3.
U.S. Appl. No. 17/107,708, Final Office Action dated Aug. 19, 2022, 52 pages.
U.S. Appl. No. 17/107,708, Office Action dated May 9, 2022, 57 pages.
U.S. Appl. No. 17/107,714. Office Action dated Aug. 18, 2022, 66 pages.
U.S. Appl. No. 17/107,764, Notice of Allowance dated May 26, 2022, 26 pages.
U.S. Appl. No. 17/107,764, Office Action dated Dec. 8, 2021, 38 pages.
U.S. Appl. No. 17/107,785, Final Office Action dated May 11, 2022, 9 pages.
U.S. Appl. No. 17/107,785, Office Action dated Jul. 7, 2022, 21 pages.
U.S. Appl. No. 17/107,785, Office Action dated Mar. 29, 2022, 30 pages.
U.S. Appl. No. 17/107,824, Notice of Allowance dated May 2, 2022, 34 pages.
U.S. Appl. No. 17/107,824, Notice of Allowance dated Jun. 7, 2022, 33 pages.
U.S. Appl. No. 17/107,824, Office Action dated Dec. 29, 2021, 30 pages.

(56) References Cited

OTHER PUBLICATIONS

U.S. Appl. No. 17/107,877, Final Office Action dated Dec. 29, 2021, 40 pages.
U.S. Appl. No. 17/107,877, Notice of Allowance dated Aug. 22, 2022, 40 pages.
U.S. Appl. No. 17/107,877, Office Action dated Aug. 18, 2021, 40 pages.
U.S. Appl. No. 17/107,891, Final Office Action dated Aug. 5, 2021, 21 pages.
U.S. Appl. No. 17/107,891, Notice of Allowance dated Nov. 2, 2021, 23 pages.
U.S. Appl. No. 17/107,891, Office Action dated Apr. 1, 2021, 22 pages.
U.S. Appl. No. 17/590,738, Notice of Allowance dated Oct. 5, 2022, 48 pages.
Van Hiep Phung et al. A High-Accuracy Model Average Ensemble of Convolutional Neural Networks for Classification of Cloud Image Patches on Small Datasets. Applied Sciences 2019. Oct. 23, 2019, pp. 1-16. Section 2; and figure 3.
Xueheng Qiu et al. Ensemble Deep Learning for Regression and Time Series Forecasting. 2014 IEEE Symposium on Computational Intelligence in Ensemble Learning (CIEL). IEEE, Dec. 9, 2014, pp. 1-6.
Li et al. "Exploration of classification confidence in ensemble learning". Pattern Recognition 47, pp. 3120-3131, Sep. 2014 https://www.sciencedirect.com/science/article/pi i/S0031320314001198 (Year: 2014).
Mousavi et al. "A new ensemble learning methodology based on hybridization of classifier ensemble selection approaches" Applied Soft Computing 37, pp. 542-666 Dec. 2015 https://www.sciencedirect.com/science/article/pii/S1568494615005797 (Year: 2015).
U.S. Appl. No. 17/107,708, Notice of Allowance dated Mar. 29, 2023, 26 pages.
U.S. Appl. No. 17/107,865, Office Action dated Aug. 4, 2023, 91 pages.
U.S. Appl. No. 17/863,107, Office Action dated Mar. 23, 2023, 33 pages.
Wang et al., Supporting Very Large Models using Automatic Dataflow Graph Partitioning, 2019 (Year: 2019).

* cited by examiner

HIERARCHICAL DATA INGESTION IN A UNIVERSAL SCHEMA

BACKGROUND

This application is a continuation of U.S. application Ser. No. 17/107,830, filed on Nov. 30, 2020, and titled "HIERARCHICAL DATA INGESTION IN A UNIVERSAL SCHEMA," which is herein incorporated by reference in its entirety.

Law enforcement agencies provide officers and agents with an assortment of devices—electronic and otherwise—to carry out duties required of a law enforcement officer. Such devices include radios (in-vehicle and portable), body-worn cameras, weapons (guns, Tasers, clubs, etc.), portable computers, and the like. In addition, vehicles such as cars, motorcycles, bicycles, and Segways, are typically equipped with electronic devices associated with the vehicle, such as vehicle cameras, sirens, beacon lights, spotlights, personal computers, etc.

It is increasingly common for law enforcement agencies to require officers to activate cameras (body-worn and vehicle-mounted) that enable officers to capture audio and/or video of incidents in which an officer is involved. This provides a way to preserve evidence, that would otherwise be unavailable, for subsequent legal proceedings. This evidence greatly aids in the investigation of criminal activities, identification of perpetrators of crimes, and examination of allegations of police misconduct, to name a few advantages.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
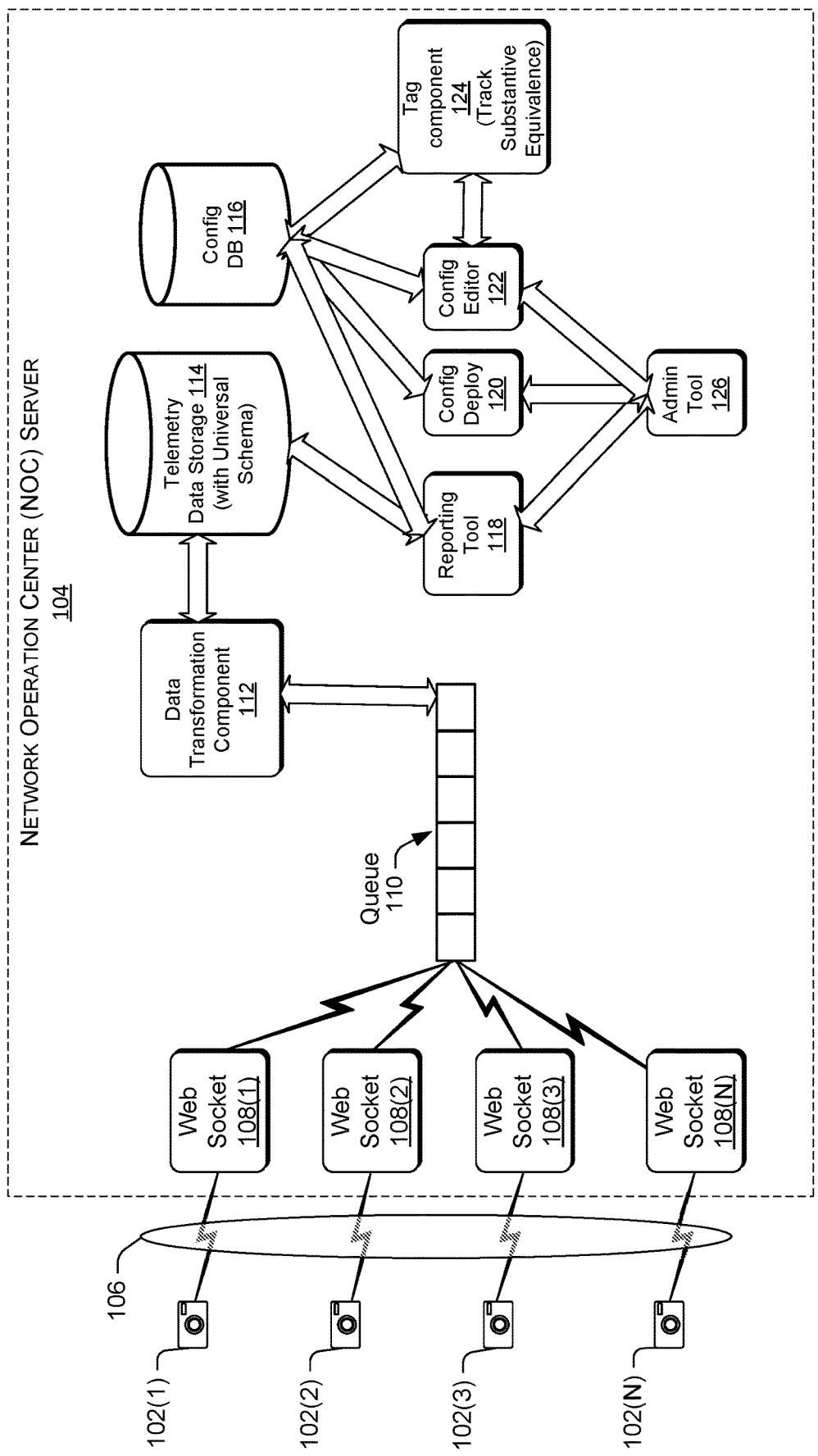
FIG. 1 illustrates an example architecture for systems and processes for implementing an object-oriented universal schema that supports mixing and matching of heterogeneous sensor formats of devices.

This disclosure is directed to techniques for creating a universal schema with default fields that support sensor formats of heterogeneous devices. Fields are broken down to smallest fields that support all the sensor formats. In one example, such as when new devices are to be deployed in a network environment to replace older devices, a network operation center (NOC) server may configure new sensor formats for the new devices. A sensor format may include a configuration of the device for collecting telemetry data that can be processed in the NOC server. In an embodiment, the sensor format may be mapped in the universal schema that observes substantial equivalents (also called substantive equivalents) on its data structure. In this embodiment, the new sensor format may include data fields that support inheritance and aggregation of other fields in sensor formats of prior devices such as the devices to be replaced. Because the new sensor format can be a superset or specializations (i.e., subclass of existing class) of the sensor formats from the prior or other devices, the mapping of the new sensor format in the universal schema may provide a coding that avoids copying of all the fields in the prior device (i.e., parent class). In addition, the mapping of the new sensor format in the universal schema may capture a mapping of substantive equivalents between the fields in the universal schema, and avoid running a risk of making different mappings of substantive equivalents in a universal schema structure, and changes in a parent class—sensor format can be easily propagated to child class—sensor format.

As defined herein, the substantive equivalents may include sufficient similarities in attributes between a child class-field (first device sensor format) and a parent class-field (second device sensor format) although the child class-field may utilize a field name, field type, bit alignment, and/or size that is different from the field name, field type, bit alignment, and/or size, respectively, of the parent class-field. Attributes that are sufficiently similar may be declared to be substantive equivalents through a use of flag or tag during creation of the universal schema. When the child class-field is detected to be a substantive equivalent of the parent class-field, a value in the child class-field may require initial transformation before it is stored in the universal schema. Alternatively, the value in the child class-field is not transformed but is directly stored to a mapped field in the universal schema that is a substantive equivalent of the child class-field. For example, the child class-field is recording timestamps in 24-hour clock (military time) time format while the substantively equivalent parent class-field is recording the timestamps based on 12-hour time format. In this example, a value in the child class-field time format (24-hour clock) is first transformed into a 12-hour time format before it is stored in the universal schema. In another example, the child class-field is using "$1^{st}$_Name" as a field name while the substantively equivalent parent class-field is using "First_Name." In this example, a value under the "$1^{st}$_Name" is directly stored (no transformation) into the field in the universal schema that is mapped to be a substantial equivalent of the child class-field "$1^{st}$_Name." In these examples, the universal schema is defined or created to observe substantial equivalents on its data field structure.

In one example, the NOC server may provision a driver for each one of the devices to be deployed in the network environment in order to establish communication with the NOC server. The NOC server may further create the new sensor format or select a sensor format to be associated with each one of the drivers to be provisioned. For the newly created sensor format, the NOC server may configure the created new sensor format to include fields that can inherit or aggregate the sensor formats from the prior or other devices. For the selected sensor format, the NOC server may select an existing sensor format from the other devices and optionally add fields that can also inherit or aggregate the other fields in the sensor formats of other devices. With the provisioned drivers and the created or selected associated sensor formats, the NOC server may deploy the devices to perform telemetry. For example, the devices may now perform periodic geolocation readings to capture locations of law enforcement officers who are using the devices, send names of the law enforcement officers who are using the devices, and the like.

In an example embodiment, the NOC server may receive telemetry data from a deployed device and transform the received telemetry data to conform with a structure of the universal schema. The structure of the universal schema may include fields that support single/multiple inheritance and aggregation of other fields in other prior device sensor formats that were previously created, configured, and/or updated. Further, the fields in the universal schema may support substantial equivalents between fields. In this regard, the NOC server may first verify whether the received telemetry data is substantially equivalent to another field in the parent class before storing the telemetry data in the universal schema.

As used herein, the terms "device," "portable device," "electronic device," and "portable electronic device" are used to indicate similar items and may be used interchangeably without affecting the meaning of the context in which they are used. Further, although the terms are used herein in relation to devices associated with law enforcement, it is noted that the subject matter described herein may be applied in other contexts as well, such as in a security system that utilizes multiple cameras and other devices.

The implementation and operations described above are ascribed to the use of the server; however, alternative implementations may execute certain operations in conjunction with or wholly within a different element or component of the system(s). Further, the techniques described herein may be implemented in a number of contexts, and several example implementations and context are provided with reference to the following figures. The term "techniques," as used herein, may refer to system(s), method(s), computer-readable instruction(s), module(s)m algorithms, hardware logic, and/or operation(s) as permitted by the context described above and throughout the document.

Example Architecture

FIG. 1 illustrates a schematic view of an example base architecture 100 for implementing an object-oriented universal schema that supports mixing and matching of heterogeneous sensor formats of media recording devices. The architecture 100 may include media recording devices 102(1)-102(N) of different types. Each of the media recording devices 102(1)-102(N) may be a video recording device, an audio recording device, or a multimedia recording device that records both video and audio data. The media recording devices 102(1)-102(N) may include recording devices that are worn on the bodies of law enforcement officers, recording devices that are attached to the equipment, e.g., motor vehicles, personal transporters, bicycles, etc., used by the law enforcement officers. For example, a law enforcement officer (not shown) that is on foot patrol may be wearing the media recording device 102(1). In the same example, another law enforcement officer that is on a vehicle patrol (not shown) may be wearing a media recording device 102(2), and so on. Further, the patrol vehicle of the law enforcement officer may be equipped with the media recording device 102(N).

Each of the media recording devices 102(1)-102(N) may include a configured sensor format for its telemetry function. The sensor format may include a set of data fields that support inheritance and aggregation of existing sensor formats. The existing sensor formats may include the sensor formats of replaced media recording devices or other media recording devices that are referenced as a base class for the configured sensor format. For example, the second media recording device 102(2) inherits from the first media recording device 102(1), the fifth media recording device 102(5) inherits (multiple inheritance) from the media recording devices 102(3) and 102(4), the tenth media recording device 102(10) aggregates the sensor formats in media recording devices 102(8) and 102(9), and so on. In this example, a remote management unit such as a network operating center (NOC) server 104 may configure the sensor formats of the media recording devices 102(1)-102(N) using inheritance or aggregation of the existing or selected sensor formats.

Given a situation where the media recording devices 102(1)-102(N) are deployed for the first time to replace old/prior media recording devices (not shown), the NOC server 104 may create new sensor formats or use existing/stored sensor formats as the configured sensor formats of the media recording devices 102(1)-102(N). In another situation, some of the deployed media recording devices 102(1)-102(N) may require reconfiguration to update their corresponding sensor formats. In this case, the NOC server 104 may use the existing/stored sensor formats to update the sensor formats of the media recording devices that require reconfiguration. The NOC server 104 stores each sensor format of replaced devices, updated devices, and newly deployed devices. The NOC server 104 may communicate with the media recording devices 102(1)-102(N) through a network 106 to configure the sensor format or in some instances, remove the sensor format of inactive media recording devices. The network 106 may be, without limitation, a local area network ("LAN"), a larger network such as a wide area network ("WAN"), a carrier network, or a collection of networks, such as the Internet. Protocols for network communication, such as TCP/IP, may be used to implement the network 106. The network 106 may provide telecommunication and data communication in accordance with one or more technical standards.

In some embodiments, a media recording device may be equipped with telemetry software and hardware that provide the device with the ability to generate telemetry data for periodic transmission to the NOC server 104 via the network 106. The telemetry hardware may include a global positioning system (GPS) chip, an assisted GPS (A-GPS) chip, or another equivalent geo-positioning sensor. The telemetry data generated by the media recording device may include an identification (ID) information of the media recording device, periodic geolocation readings of the media recording device, as well as time and date stamp information for each geolocation reading. In some instances, the media recording device may be capable of taking the geolocation reading at predetermined intervals (e.g., every 10 sec). In other cases, the media recording device may be reliant upon another device to provide telemetry data to the NOC server 104. For example, a computing device attached to the media recording device 102(2) may have geo-positioning capabilities. As such, the media recording device may rely on the attached computing device to provide the telemetry data to the NOC server 104 via the network 106.

The NOC server 104 may be part of a facility that is operated by a law enforcement agency or a facility that is operated by a third-party that is offering services to the law enforcement agency. The NOC server 104 may include web-sockets 108(1)-108(N), a queue 110, data transformation component 112, a telemetry data storage 114 with universal schema, configuration database 116, reporting tool 118, configuration deployment module 120, configuration editor module 122, a tag component 124, and an admin tool 126. Each component or module of the NOC server 104 can be realized in hardware, software, or a combination thereof. For example, the web-sockets 108(1)-108(N) may be implemented by a software module designed to establish communications with the media recording devices 102(1)-102(N), respectively.

Each one of the web-sockets 108(1)-108(N) may include an endpoint of a two-way communication link between two programs running on the network 106. The endpoint includes an Internet Protocol (IP) address and a port number that can function as a destination address of the web-socket. Each one of the web-sockets 108(1)-108(N) is bound to the IP address and the port number to enable entities such as the corresponding media recording device(s) to communicate with the web socket. In one example, the web-sockets 108(1)-108(N) may be set up to receive telemetry data from the media recording devices 102(1)-102(N). The received telemetry data may be stored in the telemetry data 114 universal schema after a transformation of the telemetry data, for example, to conform with a defined universal schema structure in the universal schema. The defined universal schema structure may include fields that support inheritance and aggregation of other fields in the sensor format of other media recording devices.

The queue 110 may include management software that processes data streams to or from the web-sockets. The queue 110 may be implemented by an event streaming platform such as an Apache Kafka™ platform. In this case, the telemetry data streams from the web sockets 108 are pushed into the queue 110 as topics and the telemetry data storage 114 may subscribe to these topics in order to decouple the telemetry data streams from event streaming platform (queue 110). A topic in the queue 110 includes an ordered collection of events that is stored in a durable manner. The topics in the queue 110 are divided into a number of partitions that store these events (records or messages) in an unchangeable sequence. The messages or records may be associated with media recording device identification, timestamps, header, and other information that relate to a transmission of data streams.

The topic may be similar to a table in a database but without the table constraints that may limit a type of data that can go into the table. For example, the telemetry data from the media recording device 102(1) includes continuous streams of telemetry data that are received through the web socket 108(1). In this example, the queue 110 may form and identify a topic for the received data streams, and the telemetry data storage 114 may decouple the data streams from the created topic in the queue 110. The decoupled data streams may be used to gather metrics from different locations, track activity of the media recording devices 102(1)-102(N), gather application logs, etc. Decoupling of data streams includes independently retrieving and processing the data streams without affecting the configuration of the source such as the queue 110.

The data transformation component 112 may be configured to transform the telemetry data from the queue 110 prior to storing the telemetry data at the telemetry data storage 114. The transformation may include changing the structure of the telemetry data to conform with the structure of the telemetry data as defined in the universal schema (telemetry data storage 114). In one example, upon receiving of the telemetry data from the queue 110, the data transformation component 112 may query the configuration database 116 to verify whether the fields in the received telemetry data are flagged or tagged. The tagging or flagging of the field in the configuration database 116 may indicate the telemetry data field to be substantively equivalent to another field.

Upon verification that the fields of the received telemetry data are tagged or flagged as substantial equivalents, then the data transformation component 112 may transform the fields of the received telemetry data in accordance with the flags or tags to conform with the defined universal schema structure in the telemetry data storage 114. The defined universal schema structure may include fields that support substantive equivalents, and inheritance or aggregation of fields. The kinds of substantive equivalents may include change in name, size, type, and bit alignment. An example application of the defined universal schema structure and transformation of telemetry data fields based on substantive equivalents is further described in FIGS. 2-8.

The telemetry data storage 114 may include a universal schema that uses object-oriented data that supports a hierarchical data model. The telemetry data storage 114 may store telemetry data fields, mapped sensor formats that support the master-detail relationship structure (i.e., parent-child relationship), and annotations that may indicate a relationship between the mapped sensor format and the sensor format from the parent class. In one example, the fields in the universal schema of the telemetry data storage 114 support inheritance and aggregation of other fields. Further, each one of the fields in the universal schema may include a flag that indicates a capability of the field to be mapped with another field on the basis of substantive equivalents. In this regard, any changes in the parent class may be automatically propagated in the universal schema.

In one example, NOC server 104 may utilize the admin tool 126, reporting tool 118, configuration deployment module 120, configuration editor 122, and tag component 124 to create new sensor formats, update existing sensor formats, or remove sensor formats. The admin tool 126 may be utilized by a user (not shown) as a control panel to perform the creation of a new sensor format, and to update or remove an existing sensor format. The admin tool 126 may use the reporting tool 118, configuration deployment module 120, configuration editor 122, and the tag component 124 to implement the functions of creating a new sensor format, placing a flag on each one of the fields that will be stored in the universal schema, updating a sensor format, entering annotations, and the like.

For example, the media recording devices 102(1)-102(10) are to be deployed for the first time to replace a previous set of old model media recording devices (not shown). In this example, the NOC server 104 may utilize the admin tool 126, reporting tool 118, configuration deployment module 120, configuration editor 122, and tag component 124 to create a new sensor format (not shown) for each one of the media recording devices 102(1)-102(10).

Referring to the deployment of the first media recording device 102(1), the admin tool 126 may first establish a connection with the media recording device 102(1) through the web-socket 108(1) that can detect a connection status of the media recording device 102(1). Upon detection of a connection status of the media recording device 102(1), the configuration editor 122 may instantiate a new driver for the media recording device 102(1). The new driver may be used by an operating system of the NOC server 104 to communicate with the connected media recording device 102(1).

The configuration editor 122 may then create a name (e.g., video recording device ID) for the media recording device 102(1), and associate the created name with the instantiated new driver. Further, the configuration editor 122 may create a new sensor format by inheriting or aggregating existing sensor formats in the configuration database 116. The existing sensor formats in the configuration database 116 may include the sensor formats of the previously deployed media recording devices and/or other currently deployed media recording devices such the media recording device 102(11)-102(N). In one example, the created new sensor format may include fields that support inheritance and aggregation of fields in the sensor formats of prior devices.

With the created new field, the configuration editor 122 associates the created new sensor format with the new driver of the media recording device 102(1), and the configuration deployment module 120 may deploy the media recording device 102(1) to perform telemetry. For example, configuration deployment module 120 sends the created new sensor format, new driver, and other information to the media recording device 102(1) through the queue 110 and the web-socket 108(1). In this example, the web-socket 108(1) may be used to facilitate the receiving of the telemetry data that can be transformed and stored in the universal schema.

Referring to the deployment of the media recording devices 102(2)-102(10) in the above example, the process as described above for the media recording device 102(1) may be similarly applied. That is, the configuration editor 122 may instantiate a new driver for each one of the media recording devices 102(2)-102(10), create individual names, associate the created names with the corresponding instantiated driver, create the new sensor formats, and so on.

Figure 2:
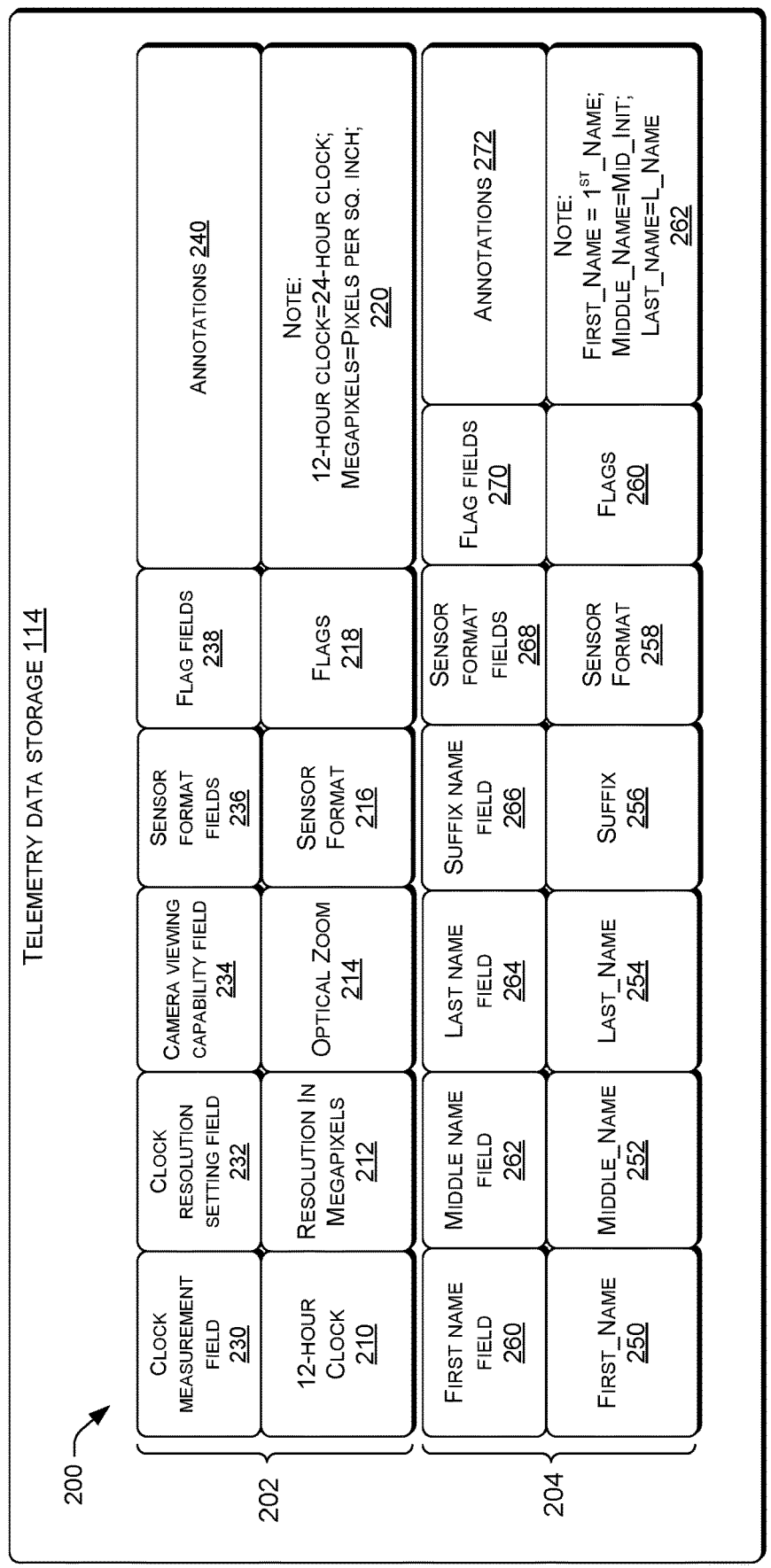
FIG. 2 is a block diagram of an example universal schema that supports inheritance and aggregation of sensor formats in prior or different devices.

In some cases, instead of creating the new sensor formats as described in the example above, the NOC server 104 may select existing sensor formats to be associated with the new drivers of the media recording devices 102(1)-102(10). In this regard, the configuration editor 122 may select the existing sensor formats in the configuration database 116, add additional field as may be necessary, and associate the selected sensor formats plus the additional field to the corresponding media recording device. Different versions of these modified formats are stored in a database by the NOC server 104. Thereafter, the configuration deployment module 120 may deploy the media recording devices 102(1)-102(10) to perform telemetry Example Universal Schema FIG. 2 is a block diagram of the telemetry data storage 114 including an example universal schema 200. The illustrated universal schema 200 includes a simplified set of fields with corresponding mapped sensor formats to illustrate the implementations described herein. In the following discussion, reference is made to elements and reference numerals shown and described with respect to the NOC server 104 of FIG. 1.

In one example, a first defined universal schema structure 202 and a second defined universal schema structure 204 may store data that are received from the media recording devices 102(1)-102(N) as described in FIG. 1. The data may include telemetry data such as periodic geolocation readings of the media recording devices, time and date timestamp for each geolocation reading, identifications (IDs) of the media recording devices, names of law enforcement officers associated with the media recording devices, etc. In this example, the data transformation component 112 receives the data and stores the received data in the universal schema 200.

The first defined universal schema structure 202 may include data fields that supports substantial equivalents and inheritance and aggregation of other data fields in a hierarchical relational database. In one example, the first defined universal schema structure 202 of the universal schema 200 may include a 12-hour clock 210 for a clock measurement field 230, a resolution in megapixels 212 for a camera resolution setting field 232, an optical zoom 214 for a camera viewing capability field 234, a sensor format 216 for sensor format fields 236, flags 218 for flag fields 238, and a note 220 for annotations 240. The annotations 240 may indicate the fields in the universal schema 202 that support substantial equivalents. The second defined universal schema structure 204 may similarly include data fields that support substantial equivalents and inheritance and aggregation of other data fields in the hierarchical relational database. In one example the second defined universal schema structure 204 of the universal schema 200 may include a "First_Name" 250 for a person's first name field 260, "Middle_Name" 252 for a person's middle name field 262, "Last_Name" 254 for a person's last name field 264, suffix 256 for a person's suffix name field 266, a sensor format 258 for sensor format fields 268, flags 260 for flag fields 270, and a note 262 for annotations 272. The annotations 272 may indicate the fields in the universal schema 204 that support substantial equivalents. The manner in which the present universal schema 200 is provided is not intended to limit the scope of the claims presented herewith but is intended merely to provide an example of what kinds of data may be used with the present techniques and how a data item may be associated with other data items and the significance thereof.

In an example embodiment, the defined universal schema structures 202/204 may support the use of substantive equivalents between its data fields. For the example universal schema structure 202, a substantive equivalent based on types is illustrated. That is, a unit of measurement (first type) in a received data field is first transformed into another unit of measurement (second type) before it is stored in the universal schema 202. That is, a 24-hour clock can be transformed into 12-hour clock time format, a resolution in megapixels can be transformed into pixels per square inches, an optical zoom measured in variables "2X, 3X, 4X . . . " may be changed to numerical percentage "200%, 300%, 400%, . . . " and so on, before they are stored in the universal schema structure 202. For the example universal schema structure 204, a substantive equivalent based on a change of name is illustrated. That is, the incoming data fields may have a different field name representation and they are mapped to substantially equivalent fields in the universal schema without transforming the values of the incoming data fields. That is, the values under the substantively equivalent field name may be direct stored into the mapped field in the universal schema 204.

Referencing the universal schema structure 202, the data transformation component 112 receives, for example, from the media recording device 102(1) a clock measurement field that is in 24-hour clock type (e.g., 1300 Hours) instead of the 12-hour clock type (12-hour clock 210). In this example, the data transformation component 112 may initially verify via the configuration database 116 if there is a flag for the clock measurement field 230 that indicates support of substantial equivalence. If the 12-hour clock 210 is flagged or supports substantial equivalents (annotation 240 includes "12-hour clock=24-hour clock"), then the data transformation component 112 may transform the unit of measurement in the value of the received clock measurement field from the 24-hour clock type into 12-hour clock type (i.e., "1300 Hours" to "1:00 PM") before storing the received clock measurement field in the clock measurement field 230 of the first universal schema structure 202.

In another example, the data transformation component 112 receives from the media recording device 102(1) an optical zoom capability (e.g., a magnification of "3X" instead of 300%, or "2X" instead of 200%, etc.) for the camera viewing capability field 234. In this example, the data transformation component 112 may again verify via the configuration database 116 if there is a flag for the camera viewing capability field to indicate support of substantial equivalents. If the camera viewing capability field is not flagged (i.e., does not indicate that there are one or more substantial equivalents in the universal schema to which this field is mapped), then the data transformation component 112 may directly store the indication of optical zoom capability in the camera viewing capability field 234 of the universal schema 200 without first transforming the indication of optical zoom to a different format or value (e.g., "3X" to 300%, "2X" to 200%), and then storing the transformed indication. In other words, the match is direct and exact, and not a substantially equivalent mapping.

In one example, the sensor format 216 may be a superset or specializations of the sensor format in the prior devices. In this case, the sensor format 216 may be defined to include a set of fields that support inheritance or aggregation of other fields in other existing sensor formats.

For the second universal schema structure 204, the storing process of the received person's first name, middle name, last name, and suffix is similar to the process as described above for the first universal schema structure 202. That is, the data transformation component 112 may receive data fields that include, for example, "1$^{st}$_Name," "Mid_Init," "L_Name," and "Suffix." In this example, the data transformation component 112 may query the configuration database 116 to verify whether each one of the received data fields is flagged or tagged. For the flagged data fields, the data transformation component 112 may store the received data fields to corresponding fields in the universal schema 204 that are mapped as substantial equivalents of the received data fields. For example, the values of the received data fields "1$^{st}$_Name," "Mid_Init," and "L_Name" are stored in substantively equivalent "first name field 260," "middle name field 262," and "last name field 264," respectively. In this kind of substantive equivalents, there is no transformation in the value of the received data field before storing of the value in the defined universal schema 204.

In some cases, the substantial equivalence between fields is based upon a user-entered parameter. That is, two distinct fields may still be declared to be substantively equivalent, and a transformation may be set up by the user to eventually correlate the two fields. For example, an American Standard Code for Information Interchange (ASCII) code "065" that is equivalent to letter "A" is assigned to a phrase "Alpha." In this example, the transformation may be set up to interpret the ASCII code "065" to "Alpha" instead of letter "A."

Example Storing of Substantially Equivalent Field-Type in the Universal Schema

Figure 3:
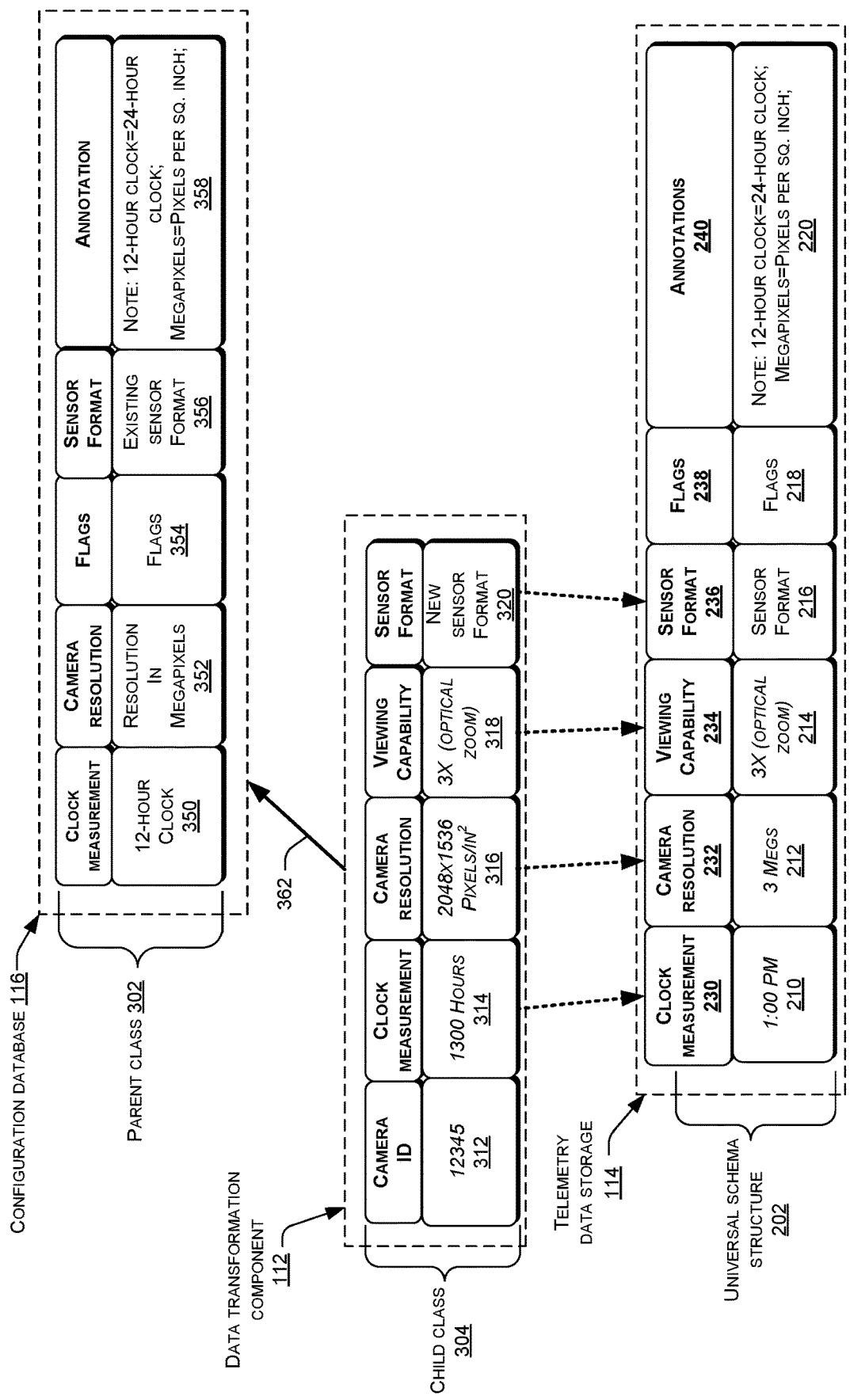
FIG. 3 is a diagram of an example concept of transforming a received set of fields that are substantially equivalent in type with a structure of the fields in a defined universal schema.

FIG. 3 is a diagram 300 showing a concept of transforming a received set of fields that are substantially equivalent in type with the structure of the fields in the defined universal schema. In the following discussion, reference is made to elements and reference numerals shown and described with respect to the first universal schema structure 202 of FIG. 2 and the NOC server 104 of FIG. 1. For example, diagram 300 shows the data transformation component 112 that receives telemetry data, the configuration database 116 that is used by the data transformation component 112 to verify the fields that support substantial equivalents, and the telemetry data storage 114 that stores the telemetry data from the data transformation component 112. Diagram 300 further shows a parent class 302 that refers to a base class object (e.g., prior or other media recording device) and corresponding fields, and a child class 304 that refers to the received telemetry data in the data transformation component 112.

In one example, the data transformation component 112 receives a set of data fields from the queue 110 and queries the configuration database 116 to verify whether each one of the received data fields is substantively equivalent with the fields in the defined universal schema 202. Given a situation where the data fields are flagged to indicate substantive equivalents, then the data transformation component 112 may transform the received data fields in accordance with the flags to conform with the structure of the defined universal schema structure 202 before storing the received data fields from the queue 110.

For example, the data transformation component 112 receives telemetry data that include "12345" 312 as camera or media recording device identification (ID), "1300 Hours" 314 as the clock measurement field, "2048×1536 pixels per square inches" 316 as the camera resolution setting field, "3X" 318 as the camera viewing capability field, and "new sensor format" 320 as the sensor format field. In this example, the data transformation component 112 may send queries to the configuration database 116 to verify whether each one of the received "1300 Hours" 314, "2048×1536 pixels per square inches" 316, and the "3X" 318 is substantially equivalent with the field structure (e.g., field-type) that is used in the defined universal schema structure 202. The universal schema structure 202 may be a superset or specialization of the parent class 302 that includes a 12-hour clock 350 for the clock measurement field, a resolution in megapixels 352 for the camera resolution setting field, flags 354 for flag fields, an existing sensor format 356 for the sensor format field, and a note 358 for the annotation field.

In an example embodiment, the configuration database 116 receives a query 362 from the data transformation component 112 with regard to verification of the received clock measurement field ("1300 Hours" 314), camera resolution setting field ("2048×1536 pixels per inch square" 316), and the viewing capability field ("3X" 318), respectively. In response to the received query 362, the configuration database 116 may send a response (not shown) indicating, for example, that the clock measurement field ("1300 Hours" 314) and the camera resolution setting field ("2048×1536 pixels per inch square" 316) are flagged as requiring transformation while the viewing capability field ("3X" 318) is not tagged/flagged. In this case, the data transformation component 112 may transform the "1300 Hours" 314 into "1:00 PM" 210 (12-hour clock) and the "2048×1536 pixels per inch square" 316 into "3 Megs" 212 before storing these fields in the defined universal schema structure 202. It is to be noted that the viewing capability field ("3X" 318) is not flagged in the configuration database 116 and, as such, the "3X" 318 may be directly stored as "3X" 214 in the defined universal schema structure 202.

In an embodiment, the sensor format 216 of the defined universal schema structure 202 may inherit from the existing sensor format 356 of the parent class 302 (prior or other devices). For example, a coding of the defined universal schema structure 202 may inherit the clock and the resolution from the parent class 302 and add the viewing capability field in the child class 304. In this example, the sensor format 216 is considered to be a superset of the existing sensor format 356 in the parent class 302. By using the sensor format 216 in the first universal schema structure 202, multiple advantages may be obtained. For example, the coding in the first universal schema structure 202 may be implemented without copying all the fields in the parent class 302. Further, the first universal schema structure 202 captures the mapping of substantive equivalents. Further still, changes in the parent class 302 can be propagated automatically to the universal schema structure 202.

Example Storing of Substantially Equivalent Field-Name in the Universal Schema

Figure 4:
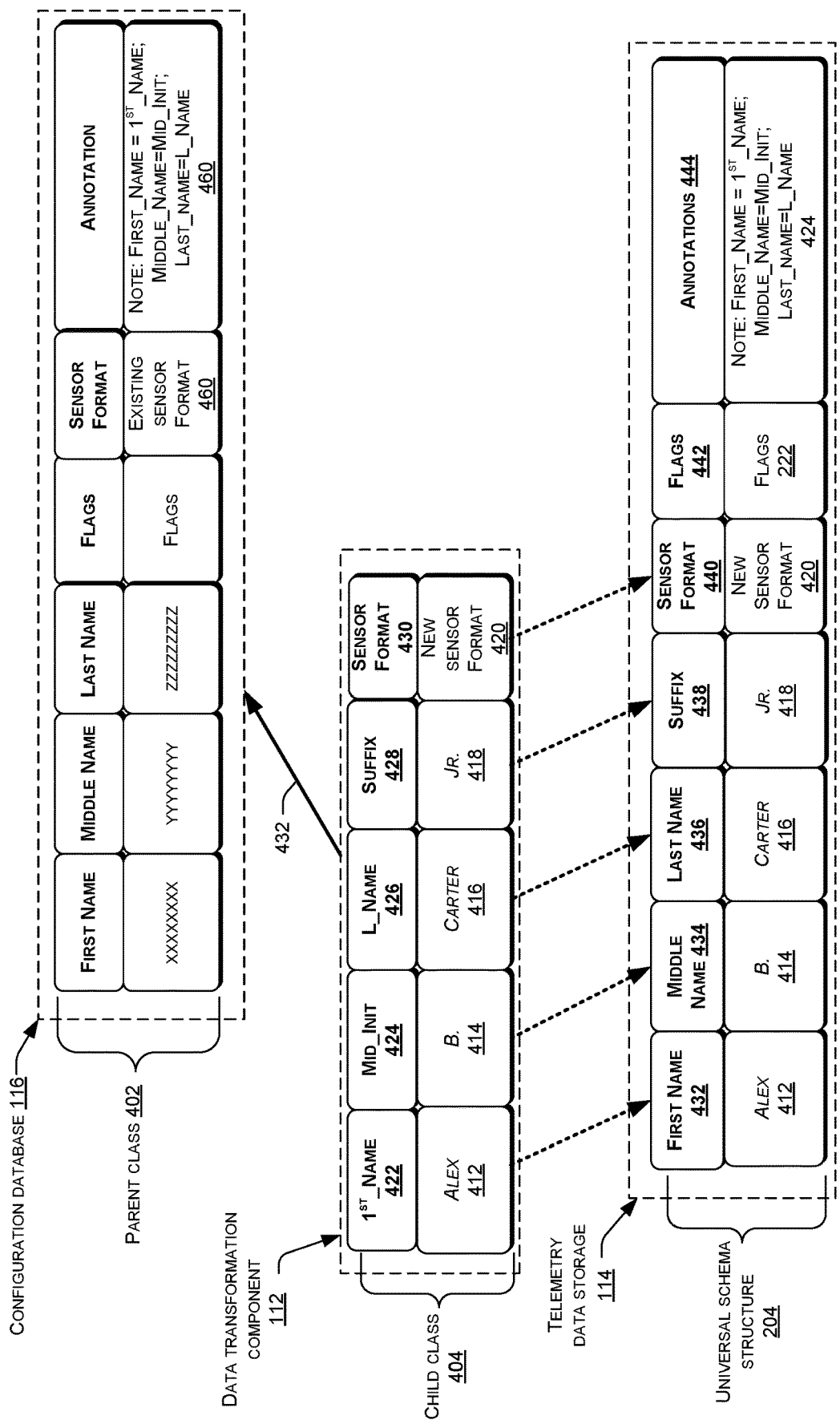
FIG. 4 is a diagram of an example concept of transforming a received set of fields that are substantially equivalent—based on a change of name—with the structure of the fields in the defined universal schema.

FIG. 4 is a diagram 400 showing a concept of mapping a received set of fields that are substantially equivalent—based on a change of name—with the structure of the fields in the defined universal schema. Diagram 400 shows no transformations in actual values of received data fields but illustrates the direct storing of the actual values to corresponding fields that are mapped as substantial equivalents of the received data fields. In the following discussion, reference is made to elements and reference numerals shown and described with respect to the second universal schema structure 204 of FIG. 2 and the NOC server 104 of FIG. 1. For example, diagram 400 shows the data transformation component 112 that receives telemetry data, the configuration database 116 that is used by the data transformation component 112 to verify the fields that support substantial equivalents, and the telemetry data storage 114 that stores the telemetry data from the data transformation component 112. Diagram 400 further shows a parent class 402 that refers to a base class object (prior device) and corresponding fields, and a child class 404 that refers to the received telemetry data in the data transformation component 112.

In one example, the data transformation component 112 receives a set of data fields from the queue 110 and queries the configuration database 116 to verify whether each one of the received data fields is substantively equivalent (based on a change of name) with the fields in the defined universal schema 202. Given a situation where the received data fields are flagged, then the data transformation component 112 may transform the received data fields to conform with the field structure of the defined universal schema structure 204 before storing the received data fields. In the case of substantive equivalents that is based upon a change of name, the data transformation component 112 may directly store the values of the received data fields to mapped fields in the universal schema that are substantial equivalents of the received data fields.

For example, the data transformation component 112 receives the telemetry data that include "Alex" 412 under "$1^{st}$_Name" 422 (i.e., field format name), "B." 414 under "Mid_Init" 424, "Carter" 416 under "L_Name" 426, "Jr." 418 under "Suffice" 428, and "new sensor format" 420 as a sensor format field 430. In this example, the data transformation component 112 may send a query 432 to the configuration database 116 to verify whether each one of the received fields includes a flag indicating a substantial equivalent with the field structure that is used in the defined universal schema structure 204. In this example, the configuration database 116 may indicate that the received data fields "$1^{st}$_Name" 422, "Mid_Init" 424, "L_Name" 426 are substantial equivalents of a "First Name" 432, "Middle Name" 434, and "Last Name 436," respectively, in the universal schema 204. Accordingly, the data transformation component 112 may directly store the values "Alex" 412, "B." 414, and "Carter" 416 in the "First Name" 432, "Middle Name" 434, and "Last Name 436," respectively. In one example, a data field "Suffix" 438 is added to the universal schema 204 that is a superset of the parent class 402. It is to be noted that the suffix field for the parent class 402 can be left as blank in the universal schema. The universal schema 204 further includes a sensor format 440, flags 442, and annotations 444. The sensor format 440 may store the new sensor format 420 that can inherit from the sensor format in the parent class 402. The flags 442 may store the flags 222 for each one of the fields in the universal schema. And the annotations 444 may indicate the substantial equivalents in the fields of the universal schema.

In one example, the new sensor format 420 of the defined universal schema structure 204 may inherit from an existing sensor format 460 of the parent class 402. For example, coding of the defined universal schema structure 204 may inherit the first name, middle name, and last name from the parent class 402 and adds the suffix field in the child class 404. In this example, the new sensor format 420 is considered as a superset of the existing sensor format 460 in the parent class 402. By using the new sensor format 420 in the universal schema structure 204, multiple advantages may be obtained. For example, the coding in the universal schema structure 204 may be implemented without copying all the fields in the parent class 402. Further, the universal schema structure 204 captures the mapping of substantive equivalents. Further still, changes in the parent class 402 can be propagated automatically to the universal schema structure 204.

Example Multiple Inheritance

Figure 5:
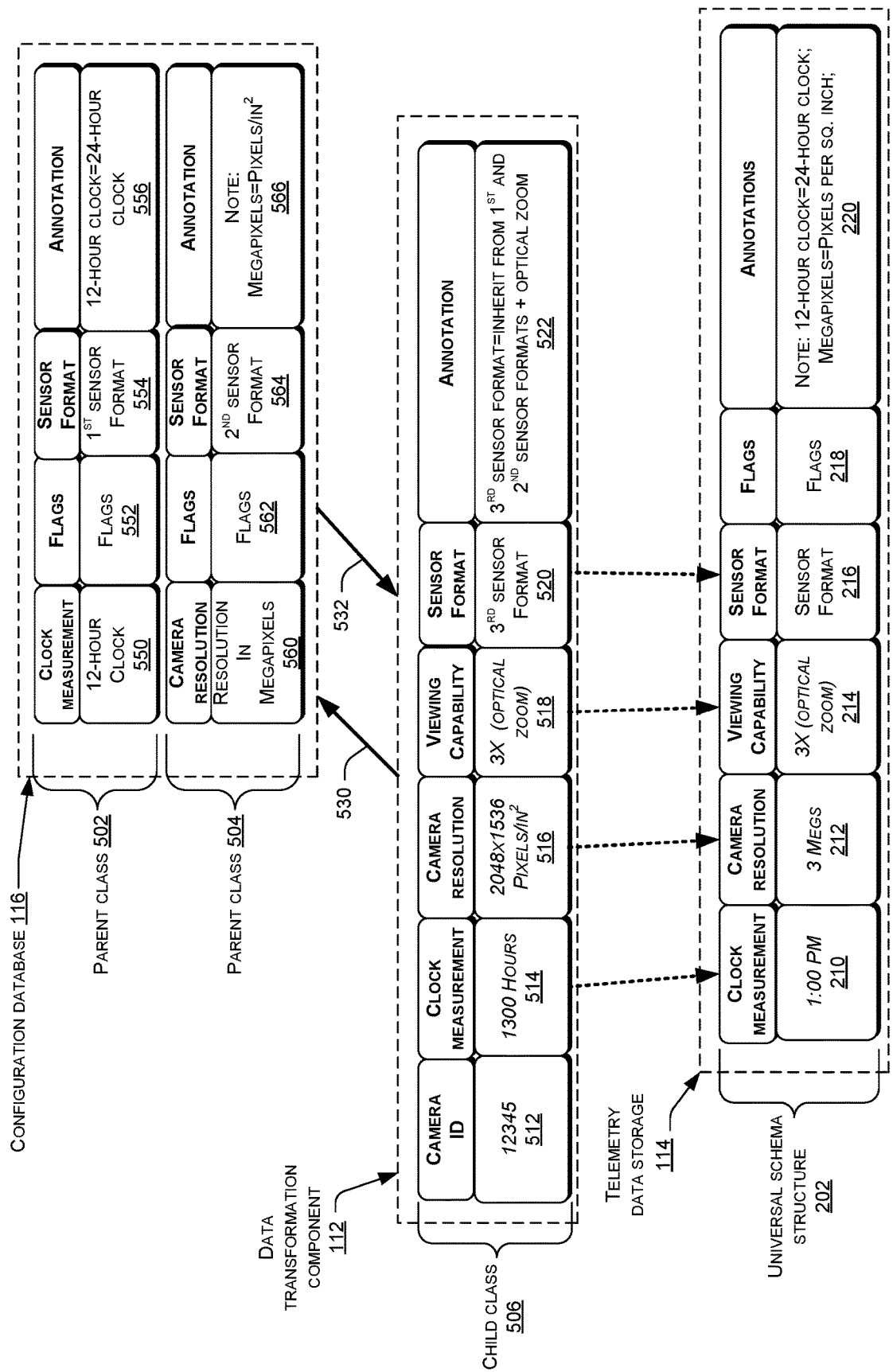
FIG. 5 is a diagram of an example concept of transforming a received set of fields that are substantially equivalent to the structure of the fields in the defined universal schema.

FIG. 5 is a diagram 500 showing a concept of transforming a received set of data fields that are substantially equivalent to the structure of the fields in the defined universal schema. Particularly, a sensor format that is mapped to the received set of fields inherits from multiple sensor formats from different base classes that support substantial equivalents. In the following discussion, reference is made to elements and reference numerals shown and described with respect to the first universal schema structure 202 of FIG. 2 and the NOC server 104 of FIG. 1. For example, diagram 500 shows the data transformation component 112 that receives telemetry data, the configuration database 116 that is used by the data transformation component 112 to verify the fields that support substantial equivalents, and the telemetry data storage 114 that stores the telemetry data from the data transformation component 112. Diagram 500 further shows a first parent class 502 that refers to a first object (e.g., first device to be replaced) and corresponding fields, a second parent class 504 that refers to a second object (e.g., second device to be replaced) and corresponding fields, and a child class 506 that refers to the received telemetry data in the data transformation component 112.

In one example, the data transformation component 112 receives a set of data fields from the queue 110 and queries the configuration database 116 to verify whether each one of the received data fields is substantively equivalent to the fields in the defined universal schema 202. Given a situation where the data fields are flagged, then the data transformation component 112 may transform the received data fields to conform with the structure of the defined universal schema structure 204 before storing the received data fields.

For example, the data transformation component 112 receives the telemetry data that include "12345" 512 as a camera or media recording device ID, "1300 Hours" 514 as the clock measurement field, "2048×1536 pixels per square inches" 516 as the camera resolution setting field, "3X" 518 as the camera viewing capability field, "$3^{rd}$ sensor format" 520 as the sensor format field, and a note 522 for the annotations. In this example, the data transformation component 112 may send queries 530 to the configuration database 116 to verify whether each one of the received "1300 Hours" 514, "2048×1536 pixels per square inches" 516, and the "3X" 518 is substantially equivalent with the field structure that is used in the defined universal schema structure 202.

The universal schema structure 202 may be a superset of the parent classes 502 and 504. As depicted, the first parent class 502 may be associated with fields that include a 12-hour clock 550 for the clock measurement field, flags 552 for flag fields, a first sensor format 554 for the sensor format field, and a note 556 for the annotation field. The second parent class 504 may be associated with a resolution in megapixels 560 for the camera resolution setting field, flags 562 for flag fields, a second sensor format 564 for the sensor format field, and a note 566 for the annotation field In an example embodiment, the configuration database 116 receives a query 530 from the data transformation component 112 to verify the received clock measurement field ("1300 Hours" 514), camera resolution setting field ("2048×1536 pixels per inch square" 516), and the viewing capability field ("3X" 518). In response to the received query 530, the configuration database 116 may send the response 532 indicating, for example, that the clock measurement field ("1300 Hours" 514) is flagged based upon the first parent class 502, the camera resolution setting field ("2048×1536 pixels per inch square" 516) is flagged based upon the second parent class 504, while the viewing capability field ("3X" 518) is not tagged/flagged. In this case, the data transformation component 112 may transform the "1300 Hours" 514 (24-hour clock) into "1:00 PM" 210 (12-hour clock) and the "2048×1536 pixels per inch square" 516 into "3 Megs" 212 before storing these fields in the defined universal schema structure 202. It is to be noted that the viewing capability field having the value "3X" 518) is not flagged in the configuration database 116 and as such, the "3X" 518 may be directly stored as "3X" 214 in the defined universal schema structure 202.

In an embodiment, the sensor format 216 may include the $3^{rd}$ sensor format 520 that inherits from the first sensor format 554 of the first parent class 502 and the second sensor format 564 of the second parent class 504. For example, a coding of the defined universal schema structure 202 may inherit the clock measurement and the camera resolution from the parent classes 502 and 504, respectively, and adds the viewing capability field in the child class 506. In this example, the sensor format 216 is considered to be a superset of the first sensor format 554 and the second sensor format 564.

In some cases, the substantial equivalents may include a difference in bit alignments (not shown) in the received telemetry data fields. For example, the data transformation component 112 receives the value "1300 Hours" 314 of the clock measurement field that includes extra bits when compared with the number of bits utilized in the "12-hour clock 550" of the parent class 502. In this example, the data transformation component 112 verifies from the configuration database 116 the presence of substantial equivalents in the bit alignment. If so, then the data transformation component 112 may accordingly adjust the bit alignment before storing the received telemetry data in the universal schema 202.

Example Implementation—Provisioning A Driver and Associating a Sensor Format

Figure 6:
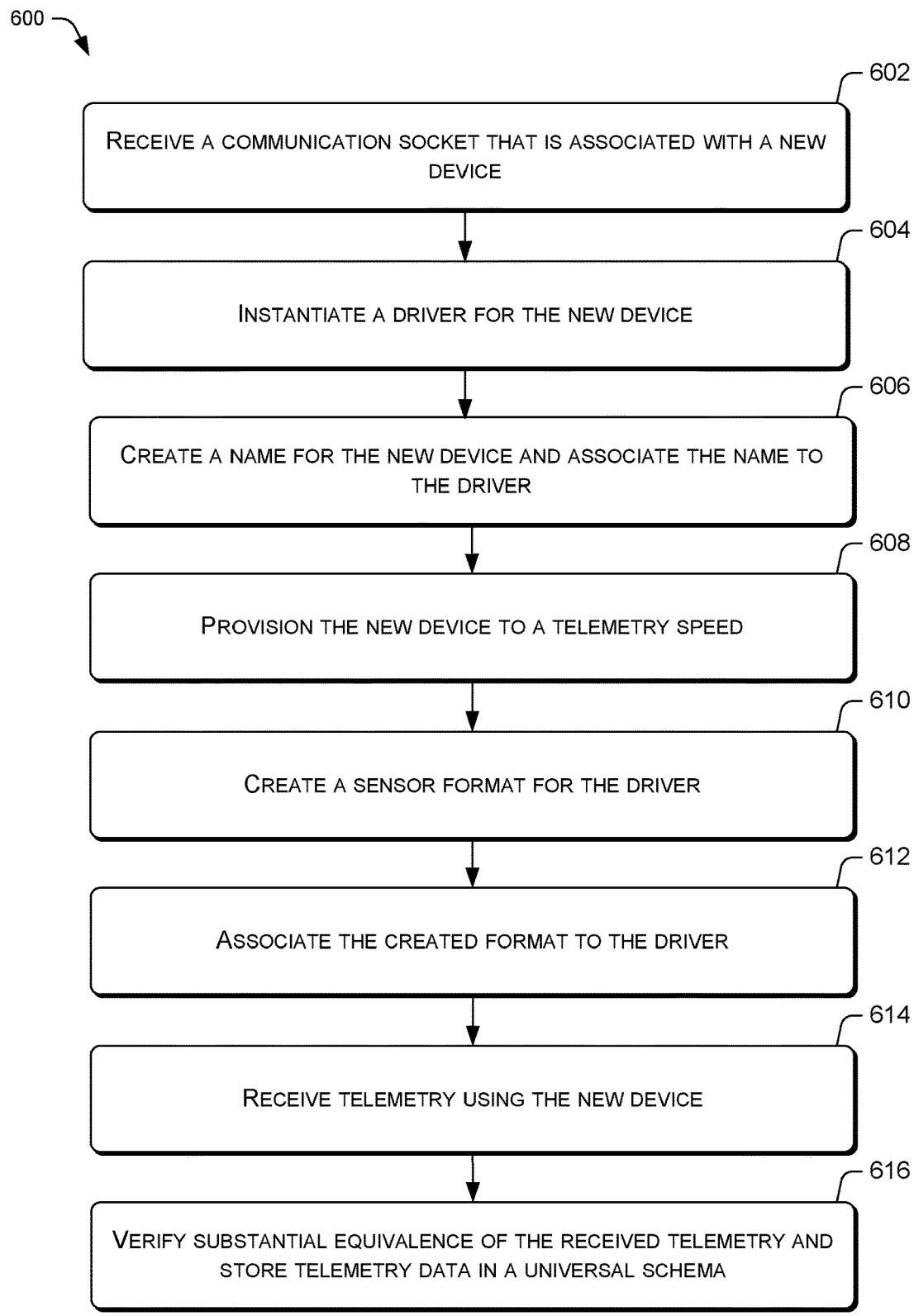
FIG. 6 is a flow diagram of an example methodological implementation for configuring a device that is to be deployed for the first time to perform telemetry.

FIG. 6 is a flow diagram 600 that depicts a methodological implementation of at least one aspect of the techniques for configuring a media recording device that is to be deployed for the first time to perform telemetry. In the following discussion of FIG. 6, continuing reference is made to the elements and reference numerals shown in and described with respect to the NOC server 104 of FIG. 1. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 602, the admin tool 126 receives a communication socket that is associated with a new video recording device to be deployed. For example, the media recording device 102(1) is deployed to replace an old media recording device. In this example, the NOC server 104 may create a corresponding web-socket (e.g., web-socket 108(1)) with an IP address and a port number for the media recording device 102(1). The IP address and the port number are communicated to the admin tool 126 as a reference for establishing a communication link with the media recording device 102(1).

At block 604, the configuration editor 122 instantiates a driver for the new media recording device. For example, the driver may be used by the operating system of the NOC server 104 to communicate with the media recording device 102(1)

At block 606, the configuration editor 122 creates a name for the new media recording device and associates the name with the instantiated driver.

At block 608, the configuration editor 122 provisions the driver with a telemetry speed. For example, the telemetry speed may include or indicate an amount of data that is buffered before it is processed in the data transformation component 112. The telemetry speed may also refer to an amount of data collected by the media recording device before the collected data are transmitted to the NOC server 104. In one example, masking of received telemetry data in the queue 110 may be based upon the provisioned telemetry speed.

At block 610, the configuration editor 122 creates a sensor format for the driver. For example, the sensor format includes the new sensor format 320, new sensor format 420, or the $3^{rd}$ sensor format 520 in FIGS. 3-5, respectively. In this example, each one of the new sensor formats 320 and 420, and the 3$^{rd}$ sensor format 520 may inherit from a parent class such as the parent class 302, parent class 402, parent class 502, etc. In some cases, the new sensor format such as the 3$^{rd}$ sensor format 520 may aggregate the sensor formats from the parent classes such as the parent classes 502 and 504. Further, the new sensor format may support multiple inheritances from different parent classes. In these cases, the new sensor format captures the mappings of substantial equivalents.

At block 612, the configuration editor 122 associates the created sensor format to the driver. In one example, the created sensor format is communicated to the media recording device 102(1) via the web-socket 108(1).

At block 614, the NOC server 104 receives telemetry from the media recording device.

At block 616, the NOC server 104 and particularly the data transformation component 112, verifies substantial equivalent (flags) before storing the telemetry data in the universal schema. For example, the data transformation component 112 queries the configuration database 116 whether a field in the received telemetry data is substantially equivalent to a field in the universal schema. Differences between substantial equivalents may include a change in name, type, size, and bit alignment. Upon verification, the data transformation component 112 may transform data from the received field to conform with the structure of the defined universal schema.

Figure 7:
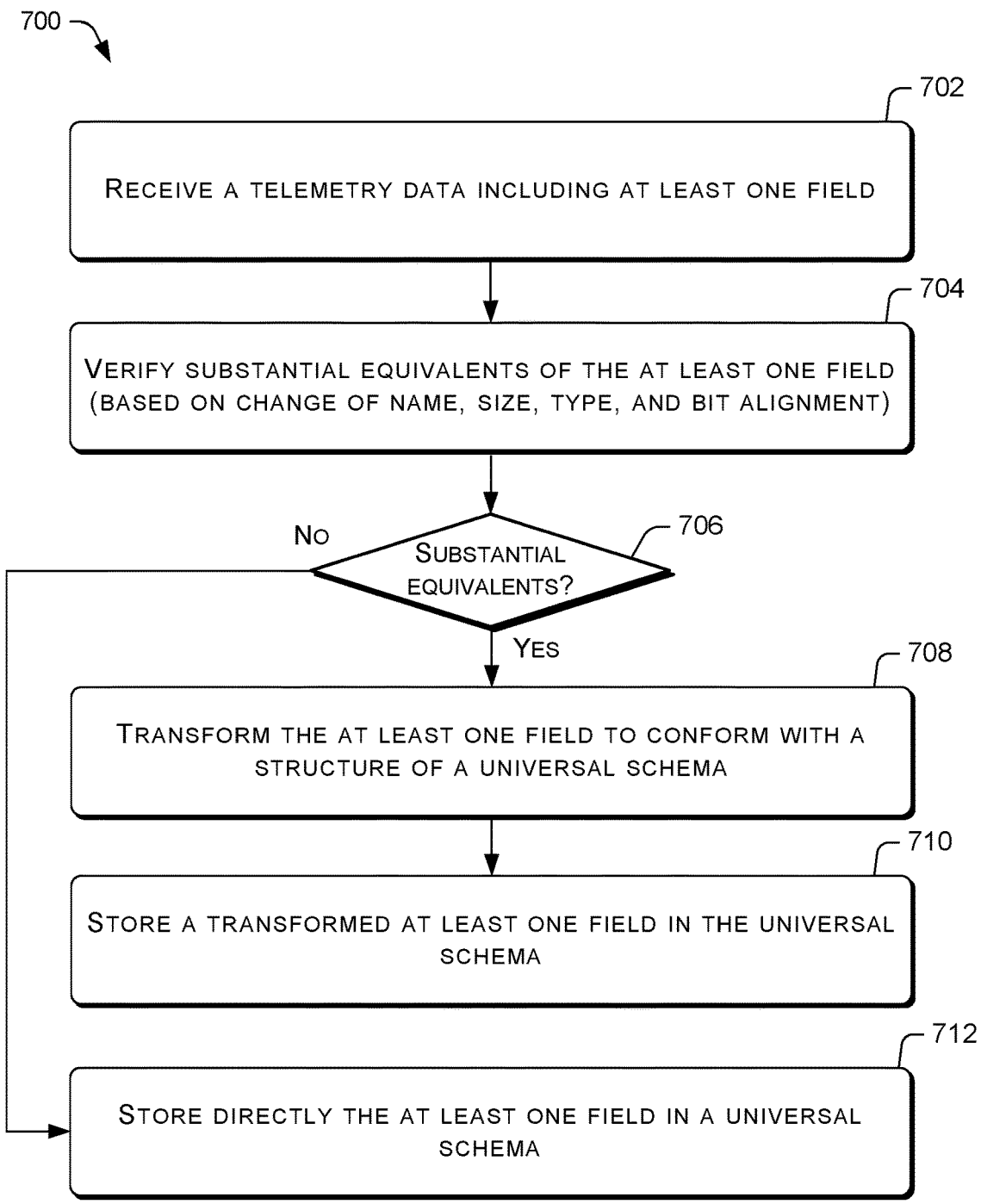
FIG. 7 is a flow diagram of an example methodological implementation for transforming a received telemetry data to conform with the structure of the defined universal schema.

Example Implementation—Storing Substantially Equivalent Fields in a Universal Schema FIG. 7 is a flow diagram 700 that depicts a methodological implementation of at least one aspect of the techniques for transforming a received telemetry data to conform with a structure of the defined universal schema. In the following discussion of FIG. 6, continuing reference is made to the elements and reference numerals shown in and described with respect to the NOC server 104 of FIG. 1. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 702, the data transformation component 112 receives telemetry data that includes at least one field from a media recording device. In one example, the NOC server 104 may use the corresponding web-socket and the queue 110 to receive the telemetry data that can include a plurality of fields.

At block 704, the data transformation component 112 verifies from the configuration database 116 substantial equivalents of the at least one field. In one example, relationships between the substantial equivalents may include or indicate kinds of differences between substantial equivalents such as a change in name, size, type, and bit alignment. In this example, the data transformation component 112 may send a query to the configuration database 116 to determine the presence of substantial equivalents for each one of the received telemetry data fields.

At decision block 706, the data transformation component 112 receives a response from the configuration database 116 that indicates the presence or absence of a flag for each one of the queried fields. In a case where one or more flags indicate substantial equivalents ("Yes" at block 706), then at block 708, the data transformation component 112 may store the received field to conform with the structure of the defined universal schema.

In one case, the data transformation component 112 may transform the "1300 Hours" to "1:00 PM" 12-hour clock before storing the value into corresponding field in the universal schema. In another case, however, the data transformation component 112 may directly store a value (e.g., "Alex") under a field name to a field in the universal schema that maps to the field name as described in FIG. 4. This type of substantial equivalent that is based upon a change in name does not require transformation before storing of values in the universal schema.

After transformation, at block 710, the data transformation component 112 stores the transformed telemetry data into the universal schema. For the change of name kind of substantial equivalents, the data transformation component 112 directly stores the value of data field to the corresponding field in the universal schema that is mapped to be a substantial equivalent of the received data field. In one example, the data transformation component 112 stores all versions, identifications, attributes, and other information for each updated sensor format.

Referring again to the decision block 706, in a case where the at least one field is not indicated to have substantial equivalence to the field in the parent class ("No" at block 706), then the data transformation component 112 may directly store the received field in the universal schema. For example, the value "3X" 518 of the viewing capability field is not substantially equivalent to another field in the prior devices, and is directly stored in the universal schema.

Example NOC Server

Figure 8:
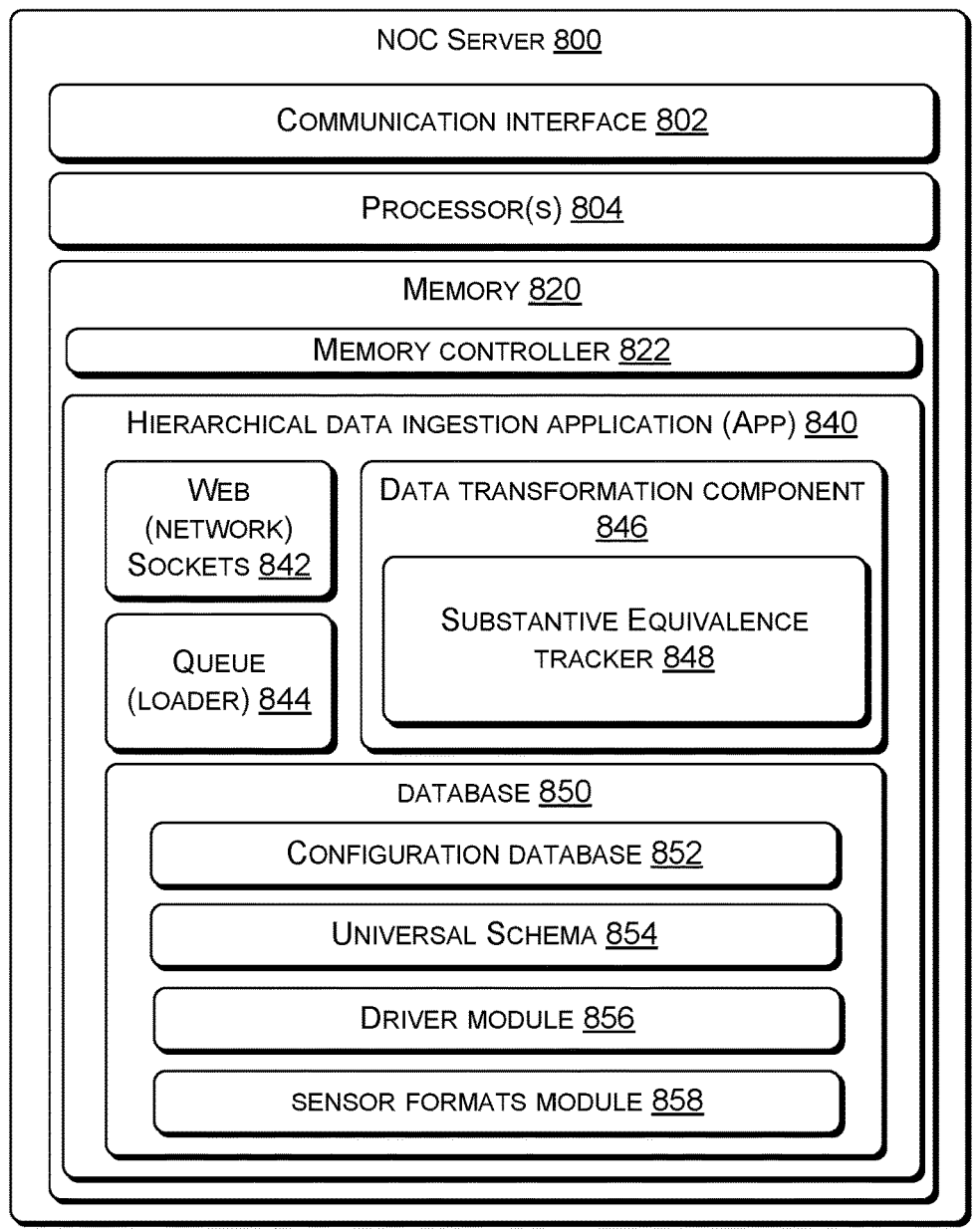
FIG. 8 is a block diagram of a network operation center (NOC) server that implements an object-oriented universal schema that supports the mixing and matching of heterogeneous sensor formats of the devices.

FIG. 8 is a diagram of an example NOC server 800 for implementing an object-oriented universal schema that supports mixing and matching of heterogeneous sensor formats of the media recording devices. The NOC server 800 is similar to the NOC server 104 of FIG. 1 and may include hardware, software, or a combination thereof, that implements deployment of the media recording devices including the configuring of each one of the media recording devices as described above with respect to FIGS. 1-7.

The NOC server 800 includes a communication interface 802 that facilitates communication with media recording devices such as the media recording devices 102(1)-102(N). Communication between the NOC server 800 and other electronic devices may utilize any sort of communication protocol known in the art for sending and receiving data and/or voice communications.

The NOC server 800 includes a processor 804 having electronic circuitry that executes instruction code segments by performing basic arithmetic, logical, control, memory, and input/output (I/O) operations specified by the instruction code. The processor 804 can be a product that is commercially available through companies such as Intel® or AMD®, or it can be one that is customized to work with and control a particular system. The processor 804 may be coupled to other hardware components used to carry out device operations. The other hardware components may include one or more user interface hardware components not shown individually—such as a keyboard, a mouse, a display, a microphone, a camera, and/or the like—that support user interaction with the NOC server 800.

The NOC server 800 also includes memory 820 that stores data, executable instructions, modules, components, data structures, etc. The memory 820 may be implemented using computer-readable media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc—Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

A memory controller 822 is stored in the memory 820 of the NOC server 800. The memory controller 822 may include hardware, software, or a combination thereof, that enables the memory 820 to interact with the communication interface 802, processor 804, and other components of the NOC server 800. For example, the memory controller 822 receives data (e.g., audio and video contents) from the communication interface 802 and sends the received data to a hierarchical data ingestion app 840 for further processing. In another example, the memory controller 822 may retrieve data from memory 820 where the data will be processed in the processor 804.

The memory 820 stores the hierarchical data ingestion app 840 that, when executed, implements the object-oriented universal schema that supports mixing and matching of heterogeneous sensor formats of the media recording devices as described herein. As shown, the hierarchical data ingestion app 840 includes a network or web-sockets 842, a queue loader 844, data transformation component 846, a substantive equivalence tracker 848, and a database 850. The database 850 may further include a configuration database 852, a universal schema 864, a driver module 856, and a sensor formats module 858. In one example, each component of the hierarchical data ingestion app 840 can be realized in hardware, software, or a combination thereof. For example, the data transformation component 846 is a software module designed to transform the received telemetry data before storing the telemetry data to the universal schema 854.

The web-sockets 842 are similar to web-sockets 108(1)-108(N) of FIG. 1. The web-sockets 842 may be implemented by a software module designed to establish communications with the media recording devices 102(1)-102(N), respectively. In one example, each one of the web-sockets 108(1)-108(N) is bound to the IP address and the port number to communicate with the corresponding media recording device. The queue 844 may include a loader that facilitates receiving or transferring of data to or from the web-sockets 842.

In one example, the queue loader 844 may include an application programming interface (API) to establish a connection with an event streaming platform such as the Apache Kafka™. The event streaming platform may utilize logs to store the telemetry data streams from the media recording devices. The logs are immutable records of things or events. The logs may include topics and partitions to store the telemetry data streams. In one example, the NOC server may subscribe to the topics in the event streaming platform and utilize the queue loader 844 to decouple the telemetry data streams.

The data transformation component 846 is similar to the data transformation component 112 of FIG. 1. The data transformation component 846 may utilize the substantive equivalence tracker 848 to verify whether the received telemetry data that includes at least one field is substantively equivalent to another field as described above in FIGS. 3-5. In on example, the substantive equivalence tracker 848 may send queries to the configuration database 852 to verify whether the received field is substantively equivalent to another field based upon type, change of name, size, or bit alignment. For verified fields (i.e., fields that are substantively equivalent to another field), the data transformation component 846 may change the structure of the verified fields to conform with the structure of the defined universal schema in the universal schema 854.

The driver module 856 and the sensor formats module may store the instantiated drivers and the configured sensor format, respectively, for each one of the media recording devices 102(1)-102(N). The creation of the sensor format or the updating of the sensor format is described above with respect to FIGS. 2-6.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media storing computer-executable instructions that upon execution cause one or more processors to perform acts comprising:
   instantiating a driver for a new device;
   creating a sensor format for the driver, wherein the sensor format includes a first set of data fields that supports multiple inheritance of sets of data fields of two or more other devices;
   receiving, via the new device, telemetry data that include values of corresponding data fields for the first set of data fields; and
   mapping the values for the corresponding data fields to a universal schema of a telemetry data storage based upon respective configurations of the sets of data fields of the two or more other devices.

2. The one or more non-transitory computer-readable storage media of claim 1, wherein a data field in the first set of data fields is substantively equivalent to a data field in at least one of the sets of data fields of the two or more other devices.

3. The one or more non-transitory computer-readable storage media of claim 1, wherein the first set of data fields is a superset of the sets of data fields of the two or more other devices.

4. The one or more non-transitory computer-readable storage media of claim 1, wherein the acts further comprise:
   provisioning the driver for the new device; and
   associating the created sensor format with the driver.

5. The one or more non-transitory computer-readable storage media of claim 1, further comprising: transforming a structure of the mapped values to conform with a structure of the universal schema.

6. The one or more non-transitory computer-readable storage media of claim 1, wherein the universal schema includes an annotation field that indicates substantive equivalents between data fields.

7. The one or more non-transitory computer-readable storage media of claim 1, wherein the new device and two or more other devices are media recording devices associated with law enforcement officers.

8. The one or more non-transitory computer-readable storage media of claim 1, wherein the new device and two or more other devices are media recording devices associated with a security system.

9. A server, comprising:
one or more processors; and
a memory having instructions stored therein, the instructions, when executed by the one or more processors, cause the one or more processors to perform acts comprising:
instantiating a driver for a new device;
creating a sensor format for the driver, wherein the sensor format includes a first set of data fields that supports multiple inheritance of sets of data fields of two or more other devices;
receiving, via the new device, telemetry data that include values of corresponding data fields for the first set of data fields; and
mapping the values for the corresponding data fields to a universal schema of a telemetry data storage based upon respective configuration of the sets of data fields of the two or more other devices.

10. The server of claim 9, wherein a data field in the first set of data fields is substantively equivalent to a data field in at least one of the sets of data fields of the two or more other devices.

11. The server of claim 9, wherein the first set of data fields is a superset of the sets of data fields of the two or more other devices.

12. The server of claim 9, wherein the server is part of a facility that is operated by or on behalf of a law enforcement agency, and the new device and two or more other devices are media recording devices associated with law enforcement officers or a security system.

13. The server of claim 9, wherein the acts further comprise:
provisioning the driver for the new device; and
associating the created sensor format with the driver.

14. The server of claim 9, wherein the acts further comprise: transforming a structure of the mapped values to conform with a structure of the universal schema.

15. The server of claim 9, wherein the universal schema includes an annotation field that indicates substantial equivalents between data.

16. A computer-implemented method, comprising:
instantiating a driver for a new device;
creating a sensor format for the driver, wherein the sensor format includes a first set of data fields that supports multiple inheritance of sets of data fields of two or more other devices;
receiving, via the new device, telemetry data that include values of corresponding data fields for the first set of data fields; and
mapping the values for the corresponding data fields to a universal schema of a telemetry data storage based upon respective configurations of the sets of data fields of the two or more other devices.

17. The computer-implemented method of claim 16, wherein a mapped value for the wherein a data field in the first set of data fields is substantively equivalent to a data field in at least one of the sets of data fields of the two or more other devices.

18. The computer-implemented method of claim 16, wherein the first set of data fields is a superset of the sets of data fields of the two or more other devices.

19. The computer-implemented method of claim 16, wherein the acts further comprise:
provisioning the driver for the new device; and
associating the created sensor format with the driver.

20. The computer-implemented method of claim 16, wherein the new device and two or more other devices are media recording devices associated with law enforcement officers.

* * * * *